United States Patent
Adachi

(10) Patent No.: US 10,175,523 B2
(45) Date of Patent: Jan. 8, 2019

(54) SUBSTRATE FOR DISPLAY APPARATUS AND DISPLAY APPARATUS

(71) Applicant: Japan Display Inc., Tokyo (JP)

(72) Inventor: Koichiro Adachi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/593,582

(22) Filed: May 12, 2017

(65) Prior Publication Data

US 2017/0336672 A1    Nov. 23, 2017

(30) Foreign Application Priority Data

May 17, 2016    (JP) .................................. 2016-098825

(51) Int. Cl.
| | | |
|---|---|---|
| G02F 1/1333 | (2006.01) | |
| G02F 1/1335 | (2006.01) | |
| G02F 1/1339 | (2006.01) | |
| G02F 1/1343 | (2006.01) | |
| G02F 1/1368 | (2006.01) | |
| G02F 1/1347 | (2006.01) | |

(52) U.S. Cl.
CPC ...... *G02F 1/133514* (2013.01); *G02F 1/1368* (2013.01); *G02F 1/13394* (2013.01); *G02F 1/133509* (2013.01); *G02F 1/133512* (2013.01); *G02F 1/134309* (2013.01); *G02F 1/13473* (2013.01); *G02F 1/133345* (2013.01); *G02F 1/133553* (2013.01); *G02F 2203/01* (2013.01); *G02F 2203/30* (2013.01)

(58) Field of Classification Search
CPC ................. G02F 1/13463; G02F 2001/136222
See application file for complete search history.

(56) References Cited

U.S. PATENT DOCUMENTS

| | | | |
|---|---|---|---|
| 7,535,540 B2 * | 5/2009 | SangChul | ......... G02F 1/133345 349/155 |
| 2014/0285743 A1 * | 9/2014 | Yu | ..................... G02F 1/133707 349/43 |

FOREIGN PATENT DOCUMENTS

JP    2014-006475 A    1/2014

* cited by examiner

*Primary Examiner* — Kendrick Hsu
(74) *Attorney, Agent, or Firm* — K&L Gates LLP

(57) ABSTRACT

According to an aspect, a substrate for a display apparatus includes: a first substrate; and at least one translucent coloring layer that overlaps with the first substrate. The at least one translucent coloring layer overlaps with an entire surface of a display region in which an image is displayed. A color of the at least one translucent coloring layer is identical across the entire surface of the display region.

20 Claims, 8 Drawing Sheets

SUBSTRATE FOR DISPLAY APPARATUS AND DISPLAY APPARATUS

CROSS-REFERENCE TO RELATED APPLICATIONS

This application claims priority from Japanese Application No. 2016-098825, filed on May 17, 2016, the contents of which are incorporated by reference herein in its entirety.

BACKGROUND

1. Technical Field

The present invention relates to a substrate for a display apparatus and a display apparatus.

2. Description of the Related Art

A monochromatic display apparatus and the like may be provided with a coloring layer for outputting white in a desired manner For example, Japanese Patent Application Laid-open Publication No. 2014-6475 (JP-A-2014-6475) discloses a coloring layer provided for adjusting white balance of a displayed image. JP-A-2014-6475 describes that the coloring layer is patterned on a substrate using a photolithography method.

However, when the coloring layer is patterned, there may be dimensional variations in the coloring layer. This may cause variations in white balance of the entire displayed image or in the entire display region.

For the foregoing reasons, there is a need for a substrate for a display apparatus and a display apparatus that can prevent variations in white balance of the displayed image.

SUMMARY

According to an aspect, a substrate for a display apparatus includes: a first substrate; and at least one translucent coloring layer that overlaps with the first substrate. The at least one translucent coloring layer overlaps with an entire surface of a display region in which an image is displayed. A color of the at least one translucent coloring layer is identical across the entire surface of the display region.

According to another aspect, a substrate for a display apparatus includes: a first substrate; a translucent resin layer that overlaps with the first substrate; and a colored spacer that overlaps with the translucent resin layer on an opposite side to the first substrate side.

According to another aspect, a display apparatus includes: a first substrate; a plurality of pixels arranged on a display region of the first substrate; and at least one translucent coloring layer that overlaps with the first substrate. The at least one translucent coloring layer overlaps with an entire surface of the display region. A color of the at least one translucent coloring layer is identical across the entire surface of the display region.

DETAILED DESCRIPTION

Figure 1:
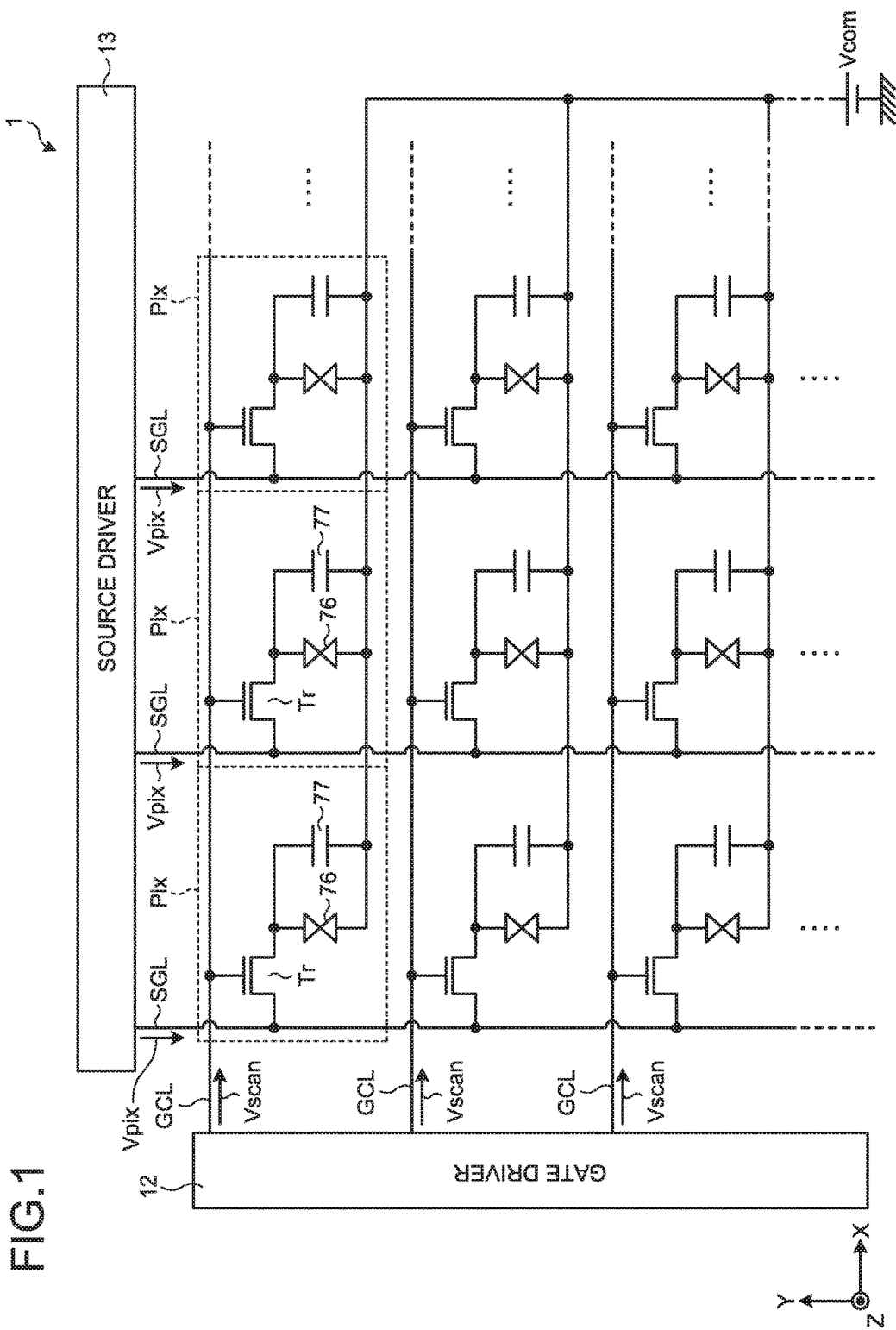
FIG. 1 is a schematic diagram illustrating a display apparatus according to an embodiment.

The following describes an embodiment of the present invention with reference to the drawings. The disclosure is merely an example, and the present invention naturally encompasses an appropriate modification maintaining the gist of the invention that is easily conceivable by those skilled in the art. To further clarify the description, the width, the thickness, the shape, and the like of each component may be schematically illustrated in the drawings as compared with an actual aspect. However, the drawings merely provide examples, and are not intended to limit interpretation of the invention. The same element as that described in the drawing already discussed is denoted by the same reference numeral throughout the description and the drawings, and detailed description thereof will not be repeated in some cases. In this disclosure, when an element is described as being "on" another element, the element can be directly on the other element, or there can be one or more elements between the element and the other element.

Figure 2:
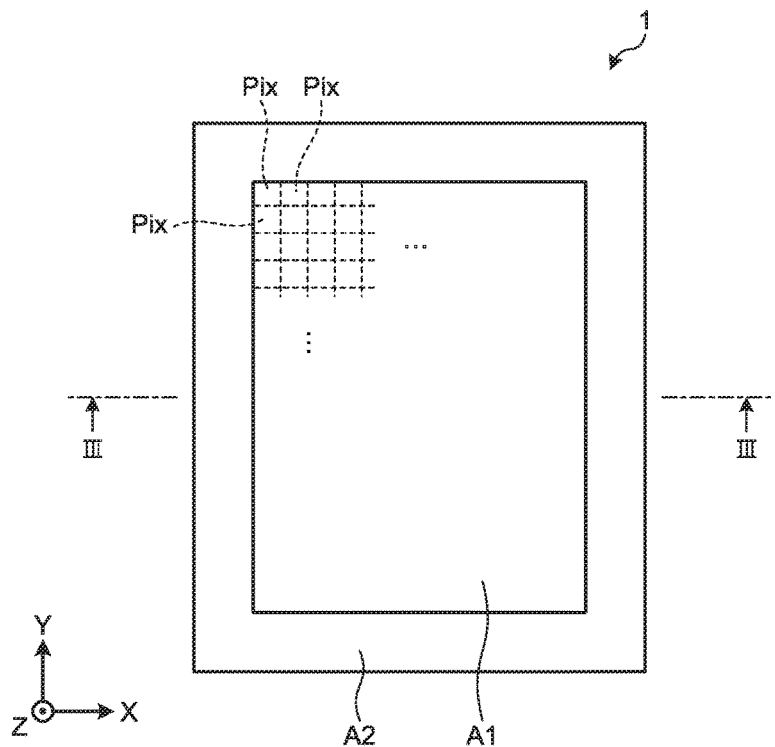
FIG. 2 is a plan view illustrating the display apparatus according to the embodiment.
Figure 3:
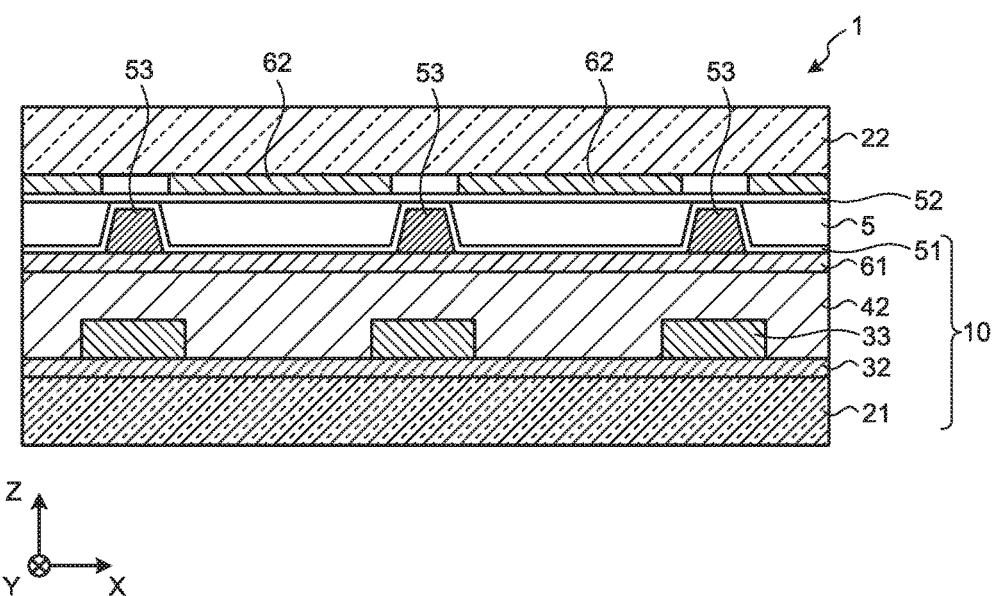
FIG. 3 is a cross-sectional view taken along line III-III in FIG. 2.
Figure 4:
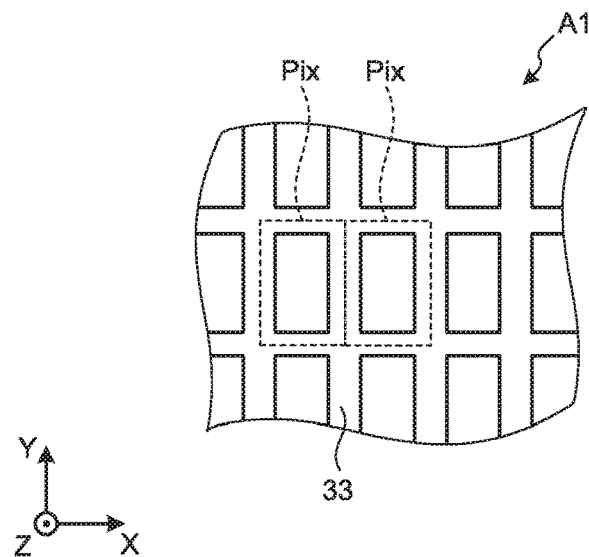
FIG. 4 is a plan view illustrating a display region of the display apparatus according to the embodiment in an enlarged manner.

FIG. 1 is a schematic diagram illustrating a display apparatus according to an embodiment. FIG. 2 is a plan view illustrating the display apparatus according to the embodiment. FIG. 3 is a cross-sectional view taken along line III-III in FIG. 2. More specifically, FIG. 3 illustrates a cross section obtained by cutting a display apparatus 1 on a plane including middle points of two parallel sides of a rectangular pixel Pix. FIG. 4 is a plan view illustrating a display region of the display apparatus according to the embodiment in an enlarged manner.

The display apparatus 1 is, for example, a monochromatic liquid crystal display apparatus. The monochromatic liquid crystal display apparatus is a display apparatus that displays an image in white and black, or in white, black, and gray. That is, the monochromatic liquid crystal display apparatus is a display apparatus that displays an image including black and white or including white, black, and intermediate gradation thereof, i.e., gray. For example, the display apparatus 1 is what is called a transmissive liquid crystal display apparatus. As illustrated in FIG. 1, the display apparatus 1 includes a gate driver 12, a source driver 13, a plurality of scanning lines GCL, a plurality of signal lines SGL, and a plurality of pixels Pix. As illustrated in FIG. 3, the display apparatus 1 also includes: a substrate 10 for a display apparatus including a first substrate 21; a second substrate 22; and a liquid crystal layer 5. The substrate 10 for a display apparatus further includes a translucent coloring layer 32, a light shielding layer 33, a translucent resin layer 42, a counter electrode 61, a spacer 53, and an orientation film 51.

As illustrated in FIG. 1, the scanning lines GCL are arranged on a plane parallel with the first substrate 21. The scanning line GCLs are coupled to the gate driver 12. The signal lines SGL are arranged on a plane parallel with the first substrate 21. The signal lines SGL are coupled to the source driver 13. The signal lines SGL cross the scanning lines GCL. In FIG. 1, for example, the signal lines SGL are orthogonal to the scanning lines GCL. In the following description, used is an XYZ orthogonal coordinate system including the X-axis parallel with the scanning lines GCL, the Y-axis parallel with the signal lines SGL, and the Z-axis orthogonal to the X-axis and the Y-axis.

As illustrated in FIG. 2, the display apparatus 1 includes a display region A1 and a frame region A2. The display region A1 is a region in which an image is displayed by pixels Pix, and has a rectangular shape, for example. The frame region A2 is a belt-shaped region surrounding the display region A1. The display region A1 may have a shape other than the rectangular shape. For example, the display region A1 may have a circular shape.

A plurality of pixels Pix are arranged in a matrix in the display region A1 illustrated in FIG. 2. Each of the pixels Pix is a white pixel. The pixel Pix includes a switching element Tr, a liquid crystal capacitor 76, and a holding capacitor 77. The switching element Tr is, for example, a thin film transistor (TFT). The source of the switching element Tr is coupled to the signal line SGL. The gate of the switching element Tr is coupled to the scanning line GCL. The drain of the switching element Tr is coupled to one end of the liquid crystal capacitor 76 and one end of the holding capacitor 77.

The liquid crystal capacitor 76 indicates a capacity component generated between a counter electrode 61 and a pixel electrode 62. One end of the liquid crystal capacitor 76 is coupled to the drain of the switching element Tr, and a common potential Vcom is supplied to the other end of the liquid crystal capacitor 76. One end of the holding capacitor 77 is coupled to the drain of the switching element Tr, and the common potential Vcom is supplied to the other end of the holding capacitor 77. The holding capacitor 77 is a capacity component for holding a voltage for image display applied between the counter electrode 61 and the pixel electrode 62.

The pixel Pix is coupled to the other pixels Pix belonging to the same row via the scanning line GCL. The gate driver 12 supplies a scanning signal Vscan (refer to FIG. 1) to the switching element Tr via the scanning line GCL. The pixel Pix is coupled to the other pixels Pix belonging to the same column via the signal line SGL. The source driver 13 supplies a pixel signal Vpix (refer to FIG. 1) to the pixel electrode 62 via the signal line SGL.

The gate driver 12 sequentially scans and drives the scanning lines GCL. The gate driver 12 applies the scanning signal Vscan to the gate of the switching element Tr of the pixel Pix via the scanning line GCL to sequentially select one row (one horizontal line) of the pixels Pix as a display driving target. The source driver 13 supplies the pixel signal Vpix to the pixels Pix included in the selected one horizontal line via the signal line SGL. Display is performed in the pixels Pix for each horizontal line in accordance with the supplied pixel signal Vpix.

The first substrate 21 is, for example, a substrate made of glass. The translucent coloring layer 32 is a coloring layer colored in one color. The translucent coloring layer 32 overlaps with one surface of the first substrate 21. For example, the area of the translucent coloring layer 32 is identical to the area of the first substrate 21 when viewed in the Z-direction. At least one surface of the translucent color layer 32 is parallel to at least one surface of the first substrate 21. In the following description, a direction in which the translucent coloring layer 32 is provided when viewed from the first substrate 21 is represented as +Z-direction.

The translucent coloring layer 32 is made of, for example, a resin or the like to which a dye or a pigment is added. The translucent coloring layer 32 is uniformly arranged on the entire surface of the display region A1. The translucent coloring layer 32 is arranged so as to overlap with all the pixel electrodes 62. The thickness of the translucent coloring layer 32 in the display region A1 is constant. The translucent coloring layer 32 is a layer for adjusting white balance of an image displayed in the display region A1. The white balance means chromaticity of white. The chromaticity is a quantitative indicator of a hue and saturation, and is represented as coordinates on the xy chromaticity diagram, for example. The color of the translucent coloring layer 32 is adjusted in accordance with a desired white color. When the color of the pixel Pix is different from the desired white color without using the translucent coloring layer 32, for example, the color of the translucent coloring layer 32 is set to a color that causes the color of the pixel Pix to be closer to the desired white color.

The translucent coloring layer 32 preferably changes white light transmitted therethrough into blue light, for example. That is, the translucent coloring layer 32 is preferably blue. The translucent coloring layer 32 according to the present embodiment is a layer for adjusting white balance of a white pixel Pix, so that the color of the translucent coloring layer 32 is preferably blue with a lower saturation than that of a blue color filter and the like used for color display. In other words, the color of the translucent coloring layer 32 is preferably blue closer to white than blue as a primary color (a color of light having a wavelength of 435.8 nm) defined by the International Commission on Illumination (CIE), for example. Desired white balance varies depending on an application purpose and a usage environment of the display apparatus 1, a user's preference, and the like, and thus the translucent coloring layer 32 according to the embodiment is colored in a desired color (not limited to blue) so that the white balance of a displayed image has a desired value.

Figure 5:
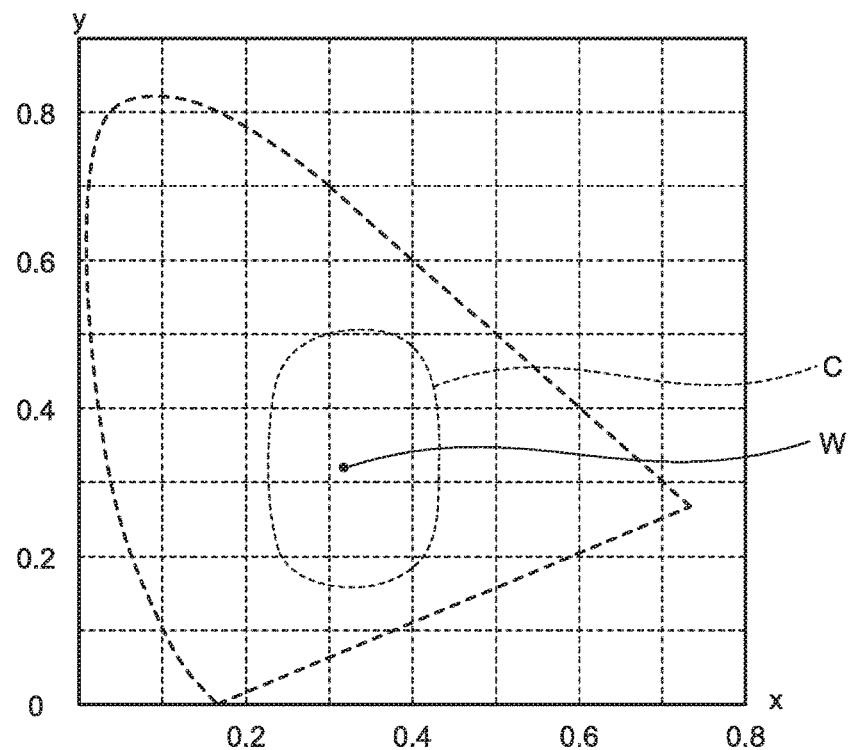
FIG. 5 is an xy chromaticity diagram for explaining chromaticity of a translucent coloring layer according to the embodiment.
Figure 6:
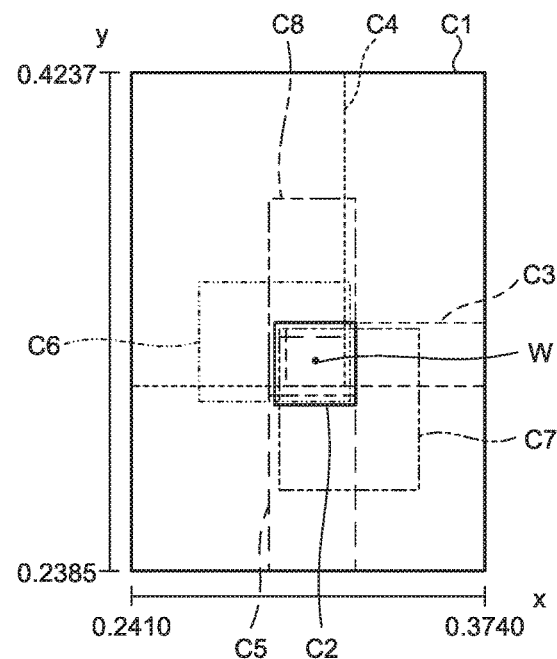
FIG. 6 is an enlarged view of a C part in FIG. 5.

FIG. 5 is an xy chromaticity diagram for explaining the chromaticity of the translucent coloring layer according to the embodiment. FIG. 6 is an enlarged view of a C part in FIG. 5. The following describes the chromaticity of the translucent coloring layer 32 according to the embodiment using the xy chromaticity diagram of an XYZ color system illustrated in FIG. 5. Assume that the chromaticity of the white pixel Pix without using the translucent coloring layer 32 is represented by coordinates W1 ((x, y)=(Wx, Wy)). When the chromaticity of the translucent coloring layer 32 is represented by coordinates WR ((x, y)=(WRx, WRy)), for example, the chromaticity of the white pixel Pix is changed to be represented by coordinates W2 ((x, y)=(Wx+WRx, Wy+WRy)). That is, the translucent coloring layer 32 according to the embodiment changes the chromaticity of the white pixel Pix. The chromaticity of the white pixel Pix which has been changed by the translucent coloring layer 32 is within a predetermined range from reference chromaticity.

For example, chromaticity of standard light C (C light source) defined by JISZ8701 is represented by coordinates W ((x, y)=(0.3101, 0.3162)) as illustrated in FIG. 5. When the standard light C is transmitted through the translucent coloring layer 32, the chromaticity of the transmitted light is preferably within a range represented by the expression (1) and outside a range represented by the expression (2). That is, the chromaticity of the translucent coloring layer 32 is preferably within a range of a region C1 and outside a range of a region C2 including the coordinates W of the chromaticity of the standard light C (C light source), the region C1 and the region C2 being illustrated in FIGS. 6.

$$0.2410 \leq x \leq 0.3740, \text{ and } 0.2385 \leq y \leq 0.4237 \quad (1)$$

$$0.2951 \leq x \leq 0.3251, \text{ and } 0.3012 \leq y \leq 0.3312 \quad (2)$$

When the translucent coloring layer 32 is colored in a color close to red, the chromaticity of the light transmitted through the translucent coloring layer 32 is preferably within a range represented by the expression (3) and outside a range represented by the expression (2). That is, the chromaticity of the translucent coloring layer 32 is preferably within a range of a region C3 illustrated in FIG. 6 and outside a range of the region C2.

$$0.2992 \leq x \leq 0.3740, \text{ and } 0.3008 \leq y \leq 0.3315 \quad (3)$$

When the translucent coloring layer 32 is colored in a color close to green, the chromaticity of the light transmitted through the translucent coloring layer 32 is preferably within a range represented by the expression (4) and outside a range represented by the expression (2). That is, the chromaticity of the translucent coloring layer 32 is preferably within a range of a region C4 illustrated in FIG. 6 and outside the range of the region C2.

$$0.2410 \leq x \leq 0.3213, \text{ and } 0.3081 \leq y \leq 0.4237 \quad (4)$$

When the translucent coloring layer 32 is colored in a color close to blue, the chromaticity of the light transmitted through the translucent coloring layer 32 is preferably within a range represented by the expression (5) and outside a range represented by the expression (2). That is, the chromaticity of the translucent coloring layer 32 is preferably within a range of a region C5 illustrated in FIG. 6 and outside the range of the region C2.

$$0.2927 \leq x \leq 0.3248, \text{ and } 0.2385 \leq y \leq 0.3265 \quad (5)$$

When the translucent coloring layer 32 is colored in a color close to cyan, the chromaticity of the light transmitted through the translucent coloring layer 32 is preferably within a range represented by the expression (6) and outside the range represented by the expression (2). That is, the chromaticity of the translucent coloring layer 32 is preferably within a range of a region C6 illustrated in FIG. 6 and outside the range of the region C2.

$$0.2669 \leq x \leq 0.3231, \text{ and } 0.3023 \leq y \leq 0.3461 \quad (6)$$

When the translucent coloring layer 32 is colored in a color close to magenta, the chromaticity of the light transmitted through the translucent coloring layer 32 is preferably within a range represented by the expression (7) and outside the range represented by the expression (2). That is, the chromaticity of the translucent coloring layer 32 is preferably within a range of a region C7 illustrated in FIG. 6 and outside the range of the region C2.

$$0.2970 \leq x \leq 0.3484, \text{ and } 0.2697 \leq y \leq 0.3290 \quad (7)$$

When the translucent coloring layer 32 is colored in a color close to yellow, the chromaticity of the light transmitted through the translucent coloring layer 32 is preferably within a range represented by the expression (8) and outside the range represented by the expression (2). That is, the chromaticity of the translucent coloring layer 32 is preferably within a range of a region C8 illustrated in FIG. 6 and outside the range of the region C2.

$$0.2925 \leq x \leq 0.3253, \text{ and } 0.3048 \leq y \leq 0.3773 \quad (8)$$

The chromaticity of the translucent coloring layer 32 also varies depending on the thickness of the translucent coloring layer 32. In the example of the translucent coloring layer 32 having a color close to red, the chromaticity of the translucent coloring layer 32 is represented by coordinates R3 ((x, y)=(0.3318, 0.3165)) when the thickness is 0.3 μm. When the thickness of the translucent coloring layer 32 is 0.4 μm, the chromaticity of the translucent coloring layer 32 is represented by coordinates R4 ((x, y)=(0.3444, 0.3163)). When the thickness of the translucent coloring layer 32 is 0.5 μm, the chromaticity of the translucent coloring layer 32 is represented by coordinates R5 ((x, y)=(0.3590, 0.3158)).

In the example of the translucent coloring layer 32 having a color close to green, the chromaticity of the translucent coloring layer 32 is represented by coordinates G3 ((x, y)=(0.2878, 0.3553)) when the thickness is 0.3 μm. When the thickness of the translucent coloring layer 32 is 0.4 μm, the chromaticity of the translucent coloring layer 32 is represented by coordinates G4 ((x, y)=(0.2735, 0.3796)). When the thickness of the translucent coloring layer 32 is 0.5 μm, the chromaticity of the translucent coloring layer 32 is represented by coordinates G5 ((x, y)=(0.2560, 0.4087)).

In the example of the translucent coloring layer 32 having a color close to blue, the chromaticity of the translucent coloring layer 32 is represented by coordinates B3 ((x, y)=(0.3087, 0.2896)) when the thickness is 0.3 μm. When the thickness of the translucent coloring layer 32 is 0.4 μm, the chromaticity of the translucent coloring layer 32 is represented by coordinates B4 ((x, y)=(0.3082, 0.2732)). When the thickness of the translucent coloring layer 32 is 0.5 μm, the chromaticity of the translucent coloring layer 32 is represented by coordinates B5 ((x, y)=(0.3077, 0.2535)).

The translucent coloring layer 32 is formed by spin coating, for example. Specifically, a blue color resist is applied to the first substrate 21, and the first substrate 21 is caused to spin. After the color resist is dried under reduced pressure, the color resist is irradiated with ultraviolet rays. Thereafter, the color resist is cured by baking. The translucent coloring layer 32 is arranged on the entire surface of the first substrate 21, so that patterning is not required in forming the translucent coloring layer 32.

The light shielding layer 33 is what is called a black matrix. The light shielding layer 33 overlaps with the translucent coloring layer 32 in the +Z-direction. That is, the light shielding layer 33 is arranged in a layer different from the translucent coloring layer 32. As illustrated in FIG. 4, the light shielding layer 33 is arranged in a grid-like fashion. Specifically, the light shielding layer 33 is arranged at a position overlapping with the scanning lines GCL and the signal lines SGL. As illustrated in FIG. 4, one pixel Pix surrounded by the light shielding layer 33 when viewed in the Z-direction corresponds to one pixel electrode 62. The translucent coloring layer 32 includes one color, and thus adjacent pixels Pix emit light of the same color when the adjacent pixels Pix have the same gradation.

The translucent resin layer 42 is a transparent layer made of a resin. The translucent resin layer 42 overlaps with the translucent coloring layer 32 and the light shielding layer 33 in the +Z-direction. The translucent resin layer 42 at least overlaps with the entire surface of the display region A1 when viewed in the Z-direction, for example. The color of the translucent coloring layer 32 as a single layer is the same across the entire surface of the display region A1. The translucent resin layer 42 is made of, for example, a photo-curable resin, which is applied to the translucent coloring layer 32 and the light shielding layer 33 and irradiated with ultraviolet rays to be cured. The translucent resin layer 42 is arranged between the light shielding layer 33 and the liquid crystal layer 5 to prevent the liquid crystal layer 5 from being contaminated by the light shielding layer 33. That is, the translucent resin layer 42 functions as an overcoat layer. The translucent resin layer 42 preferably has a predetermined thickness or more to prevent the liquid crystal layer 5 from being contaminated by the light shielding layer 33, and to flatten a level difference between a portion where the light shielding layer 33 is arranged and a portion where the light shielding layer 33 is not arranged.

The counter electrode 61 is, for example, a transparent electrode. Specifically, the counter electrode 61 is made of indium tin oxide (ITO). The counter electrode 61 overlaps with the translucent resin layer 42 in the +Z-direction. The counter electrode 61 is formed on the surface of the translucent resin layer 42 using a sputtering method, for example.

The spacer 53 is a member for maintaining the thickness (cell gap) of the liquid crystal layer 5. The spacer 53 overlaps with the counter electrode 61 in the +Z-direction. The spacer 53 also overlaps with the light shielding layer 33. The spacer 53 is preferably arranged at a crossing portion of the grid-like light shielding layer 33. As illustrated in FIG. 3, the width of the spacer 53 in the X-direction is smaller than the width of the light shielding layer 33 in the X-direction. The same applies to widths in the Y-direction.

The orientation film 51 is a film for orienting liquid crystal molecules of the liquid crystal layer 5 in a predetermined direction. The orientation film 51 overlaps with the counter electrode 61 in the +Z-direction.

The second substrate 22 is a substrate made of glass, for example, and is parallel with the first substrate 21. The pixel electrode 62 is formed on the second substrate 22. The pixel electrode 62 is made of, for example, ITO. For example, the pixel electrode 62 is formed on the surface of the second substrate 22 using the sputtering method. A plurality of pixel electrodes 62 are arranged in a matrix. One pixel electrode 62 corresponds to one pixel Pix. An orientation film 52 is arranged on the pixel electrode 62 in the −Z-direction. For example, a backlight is arranged on the second substrate 22 in the +Z-direction. Light from the backlight sequentially passes through the second substrate 22, the liquid crystal layer 5, and the substrate 10 for a display apparatus, and is emitted toward the first substrate 21 in the −Z-direction.

The liquid crystal layer 5 can change light transmittance in accordance with the state of an electric field. The display apparatus 1 is a display apparatus of a twisted nematic (TN) system, for example. The electric field of the liquid crystal layer 5 is changed by the counter electrode 61 disposed on one side of the liquid crystal layer 5 and the pixel electrode 62 disposed on the other side of the liquid crystal layer 5.

The display apparatus 1 is not necessarily the display apparatus of the TN system. For example, the display apparatus 1 may be a display apparatus of a vertical alignment (VA) system, an in-plane switching (IPS) system, or a fringe field switching (FFS) system. The display apparatus 1 may also be a reflective liquid crystal display apparatus. When the display apparatus 1 is a reflective liquid crystal display apparatus, the display apparatus 1 has a reflective electrode that reflects light as the pixel electrode 62 instead of the transparent electrode, or has a reflective plate and the like on the second substrate 22 in the +Z-direction.

The translucent coloring layer 32 is not necessarily a single layer, and may be two or more layers. That is, the substrate 10 for a display apparatus includes at least one translucent coloring layer 32. When the number of translucent coloring layers 32 is two or more, the second and subsequent translucent coloring layers 32 are also preferably arranged on the entire surface of the display region A1 and colored in the same color across the entire surface. Arranging two or more translucent coloring layers 32 allows white balance (chromaticity of white) of the image displayed in the display region A1 to be adjusted to have a desired value.

As described above, the substrate 10 for a display apparatus includes the first substrate 21 and at least one translucent coloring layer 32 that overlaps with the first substrate 21. The translucent coloring layer 32 as a single layer at least overlaps with the entire surface of the display region A1 in which the image is displayed. The color of the translucent coloring layer 32 as a single layer is the same across the entire surface of the display region A1. The translucent coloring layer 32 at least overlaps with the entire surface of the display region A1, so that patterning is not required in forming the translucent coloring layer 32. This configuration prevents variations in transmission characteristics due to a film thickness and a dimension of the translucent coloring layer 32 in the display region A1. Accordingly, the substrate 10 for a display apparatus and the display apparatus 1 can prevent variations in white balance of the entire displayed image or a displayed image in the entire display region A1.

The substrate 10 for a display apparatus includes the light shielding layer 33 that overlaps with the translucent coloring layer 32, and the translucent coloring layer 32 is arranged in a layer different from the light shielding layer 33. This configuration prevents streak unevenness and the like of a coloring resist to be applied by spin coating, which may occur when the translucent coloring layer 32 is patterned in the same layer as the light shielding layer 33, for example.

In many cases, the translucent resin layer 42 is not completely transparent, and is tinged with yellow. To remove yellow, the color of the translucent coloring layer 32 is preferably blue. Blue is a complementary color of yellow. The color of the translucent coloring layer 32 is preferably a complementary color or a color close to the complementary color of the color of light emitted from the display apparatus 1 toward a person when the display apparatus 1 has no translucent coloring layer 32.

First Modification

Figure 7:
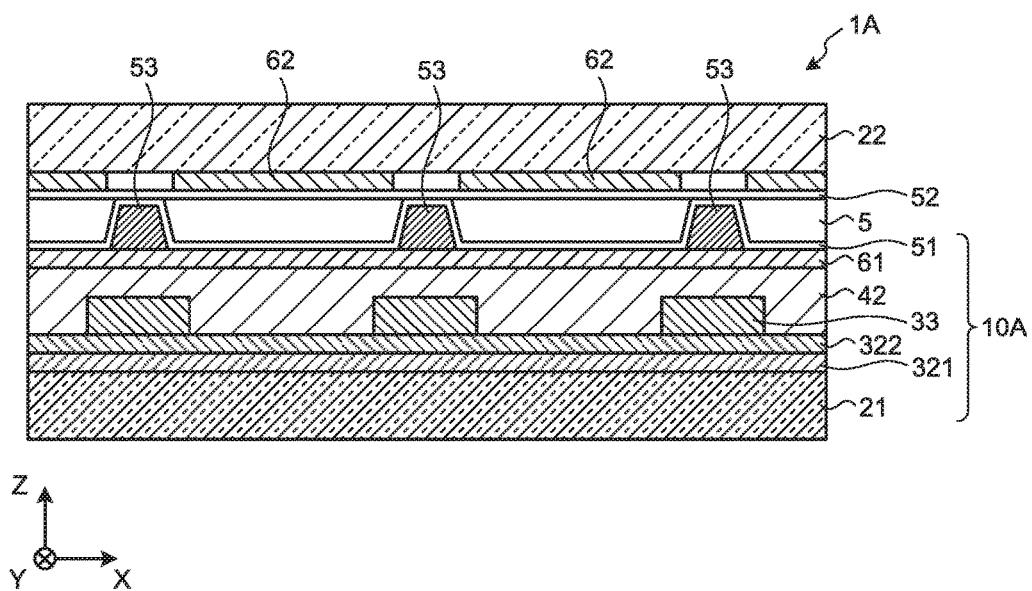
FIG. 7 is a cross-sectional view of a display apparatus according to a first modification of the embodiment.
Figure 8:
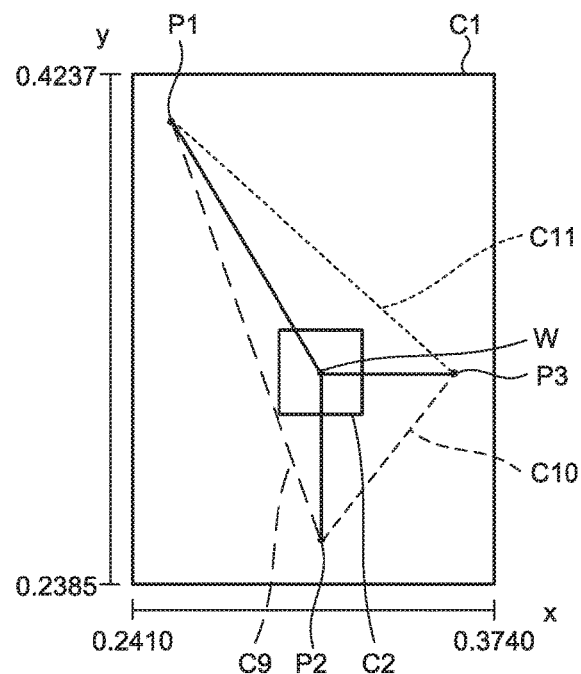
FIG. 8 is an enlarged xy chromaticity diagram for explaining chromaticity of a translucent coloring layer according to the first modification.

FIG. 7 is a cross-sectional view of the display apparatus according to a first modification of the embodiment. More specifically, FIG. 7 illustrates a cross section obtained by cutting a display apparatus 1A on a plane including middle points of two parallel sides of the rectangular pixel Pix. FIG. 8 is an enlarged view of the xy chromaticity diagram for explaining the chromaticity of the translucent coloring layer according to the first modification. A substrate 10A for a display apparatus according to the first modification is different from the substrate of the embodiment described above in that it includes two translucent coloring layers (a first translucent coloring layer 321 and a second translucent coloring layer 322).

The first translucent coloring layer 321 is a coloring layer colored in one color. The first translucent coloring layer 321 overlaps with one surface of the first substrate 21. The color of the first translucent coloring layer 321 is yellow, for example. The first translucent coloring layer 321 at least overlaps with the entire surface of the display region A1 when viewed in the Z-direction, for example. The color of the first translucent coloring layer 321 as a single layer is the same across the entire surface of the display region A1.

The second translucent coloring layer 322 is a coloring layer colored in one color. The second translucent coloring layer 322 overlaps with one surface of the first substrate 21. The color of the second translucent coloring layer 322 is cyan, for example. The second translucent coloring layer 322 at least overlaps with the entire surface of the display region A1 when viewed in the Z-direction, for example. The color of the second translucent coloring layer 322 as a single layer is the same across the entire surface of the display region A1.

The colors of the first translucent coloring layer 321 and the second translucent coloring layer 322 are not limited to yellow and cyan. The colors of the first translucent coloring layer 321 and the second translucent coloring layer 322 may be different from each other, or may be the same. The display apparatus 1A includes a plurality of translucent coloring layers (the first translucent coloring layer 321 and the second translucent coloring layer 322) to cause white balance of the displayed image to have a desired value.

When one of the first translucent coloring layer 321 and the second translucent coloring layer 322 is colored in a color close to blue and the other one thereof is colored in a color close to green, the chromaticity of light transmitted through the first translucent coloring layer 321 and the second translucent coloring layer 322 is preferably within a range of a region C9 and outside a range of a region C2, the region C9 and the region C2 being illustrated in FIG. 8. The region C9 is a triangular region having vertices at the coordinates W, coordinates P1 ((x, y)=(0.2560, 0.4087)), and coordinates P2 ((x, y)=(0.3077, 0.2535)).

When one of the first translucent coloring layer 321 and the second translucent coloring layer 322 is colored in a color close to red and the other one thereof is colored in a color close to blue, the chromaticity of light transmitted through the first translucent coloring layer 321 and the second translucent coloring layer 322 is preferably within a range of a region C10 illustrated in FIG. 8 and outside the range of the region C2. The region C10 is a triangular region having vertices at the coordinates W, the coordinates P2 ((x, y)=(0.3077, 0.2535)), and coordinates P3 ((x, y)=(0.3590, 0.3158)).

When one of the first translucent coloring layer 321 and the second translucent coloring layer 322 is colored in a color close to green and the other one thereof is colored in a color close to red, the chromaticity of light transmitted through the first translucent coloring layer 321 and the second translucent coloring layer 322 is preferably within a range of a region C11 illustrated in FIG. 8 and outside the range of the region C2. The region C11 is a triangular region having vertices at the coordinates W, the coordinates P1 ((x, y)=(0.2560, 0.4087)), and the coordinates P3 ((x, y)= (0.3590, 0.3158)).

Second Modification

Figure 9:
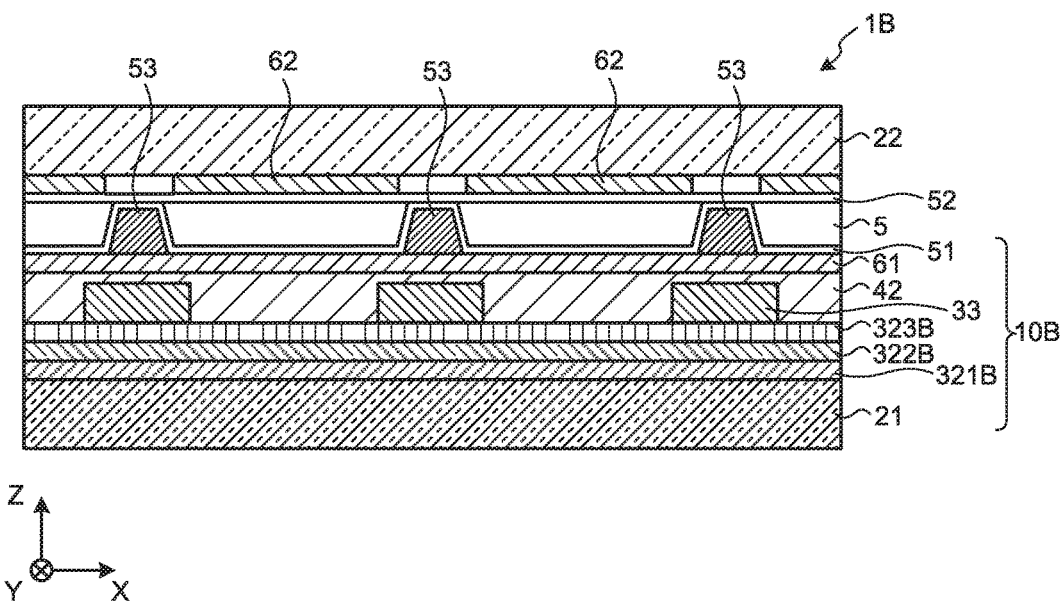
FIG. 9 is a cross-sectional view of a display apparatus according to a second modification of the embodiment.

FIG. 9 is a cross-sectional view of the display apparatus according to a second modification of the embodiment. More specifically, FIG. 9 illustrates a cross section obtained by cutting a display apparatus 1B on a plane including middle points of two parallel sides of the rectangular pixel Pix. A substrate 10B for a display apparatus according to the second modification is different from the substrate 10 for a display apparatus of the embodiment described above in that it includes three translucent coloring layers (a first translucent coloring layer 321B, a second translucent coloring layer 322B, and a third translucent coloring layer 323B).

The first translucent coloring layer 321B is a coloring layer colored in one color. The first translucent coloring layer 321B overlaps with one surface of the first substrate 21. The color of the first translucent coloring layer 321B is cyan, for example. The first translucent coloring layer 321B at least overlaps with the entire surface of the display region A1 when viewed in the Z-direction, for example. The color of the first translucent coloring layer 321B as a single layer is the same across the entire surface of the display region A1.

The second translucent coloring layer 322B is a coloring layer colored in one color. The second translucent coloring layer 322B overlaps with one surface of the first substrate 21. The color of the second translucent coloring layer 322B is yellow, for example. The second translucent coloring layer 322B at least overlaps with the entire surface of the display region A1 when viewed in the Z-direction, for example. The color of the second translucent coloring layer 322B as a single layer is the same across the entire surface of the display region A1.

The third translucent coloring layer 323B is a coloring layer colored in one color. The third translucent coloring layer 323B overlaps with one surface of the first substrate 21. The color of the third translucent coloring layer 323B is cyan, for example. The third translucent coloring layer 323B at least overlaps with the entire surface of the display region A1 when viewed in the Z-direction, for example. The color of the third translucent coloring layer 323B as a single layer is the same across the entire surface of the display region A1.

The colors of the first translucent coloring layer 321B, the second translucent coloring layer 322B, and the third translucent coloring layer 323B are not limited to yellow and cyan. The colors of the first translucent coloring layer 321B, the second translucent coloring layer 322B, and the third translucent coloring layer 323B may be different from one another, or may be the same. The display apparatus 1A includes a plurality of translucent coloring layers (the first translucent coloring layer 321B, the second translucent coloring layer 322B, and the third translucent coloring layer 323B) to cause white balance of the displayed image to have a desired value.

Third Modification

Figure 10:
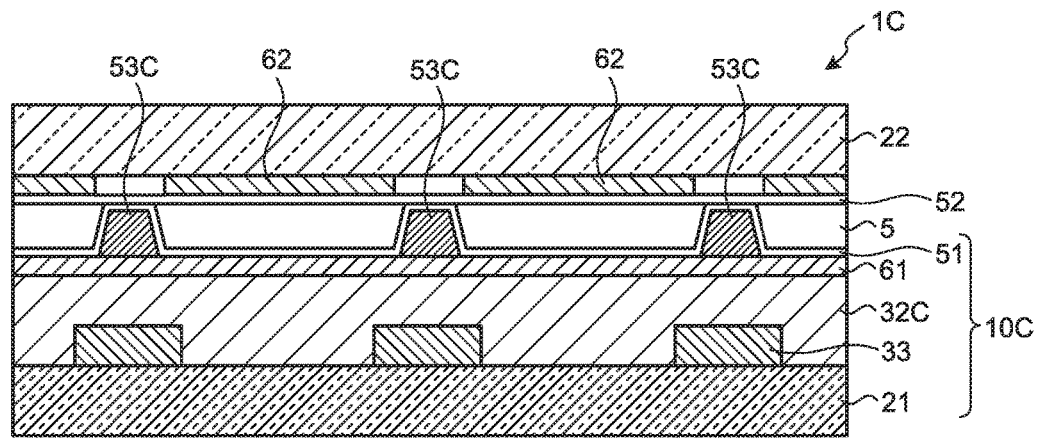
FIG. 10 is a cross-sectional view of a display apparatus according to a third modification of the embodiment.

FIG. 10 is a cross-sectional view of the display apparatus according to a third modification of the embodiment. More specifically, FIG. 10 illustrates a cross section obtained by cutting a display apparatus 1C on a plane including middle points of two parallel sides of the rectangular pixel Pix. A substrate 10C for a display apparatus according to the third modification includes a translucent coloring layer 32C different from the translucent coloring layer 32 described above.

In the third modification, the light shielding layer 33 is formed on a surface of the first substrate 21. The translucent coloring layer 32C is a coloring layer colored in one color, and is made of a resin, for example. The translucent coloring layer 32C directly overlaps with the light shielding layer 33 in the +Z-direction. In other words, the translucent coloring layer 32C is in contact with a surface of the light shielding layer 33 in the +Z-direction. The color of the translucent coloring layer 32C is blue, for example. When viewed in the Z-direction, for example, the translucent coloring layer 32C at least overlaps with the entire surface of the display region A1 in which the image is displayed. The color of the translucent coloring layer 32C as a single layer is the same across the entire surface of the display region A1. The thickness of the translucent coloring layer 32C in the Z-direction is larger than the thickness of the light shielding layer 33 in the Z-direction. The translucent coloring layer 32C is, for example, a photo-curable resin, which is applied to the first substrate 21 and the light shielding layer 33 and irradiated with ultraviolet rays to be cured.

This configuration does not require patterning in forming the translucent coloring layer 32C, thereby preventing variations in dimension of the translucent coloring layer 32C. Arranging the translucent coloring layer 32C between the light shielding layer 33 and the liquid crystal layer 5 prevents the liquid crystal layer 5 from being contaminated by the light shielding layer 33. The translucent coloring layer 32C preferably has a sufficient thickness to prevent the liquid crystal layer 5 from being contaminated by the light shielding layer 33, and to flatten unevenness caused by the thickness of the light shielding layer 33. The translucent coloring layer 32C functions as an overcoat layer.

A spacer 53C is a member for maintaining the thickness (cell gap) of the liquid crystal layer 5. The spacer 53C overlaps with the counter electrode 61 in the +Z-direction. The spacer 53C overlaps with the translucent coloring layer 32C in the +Z-direction, and also overlaps with the light shielding layer 33. The spacer 53C is preferably arranged at a crossing portion of the grid-like light shielding layer 33.

Fourth Modification

Figure 11:
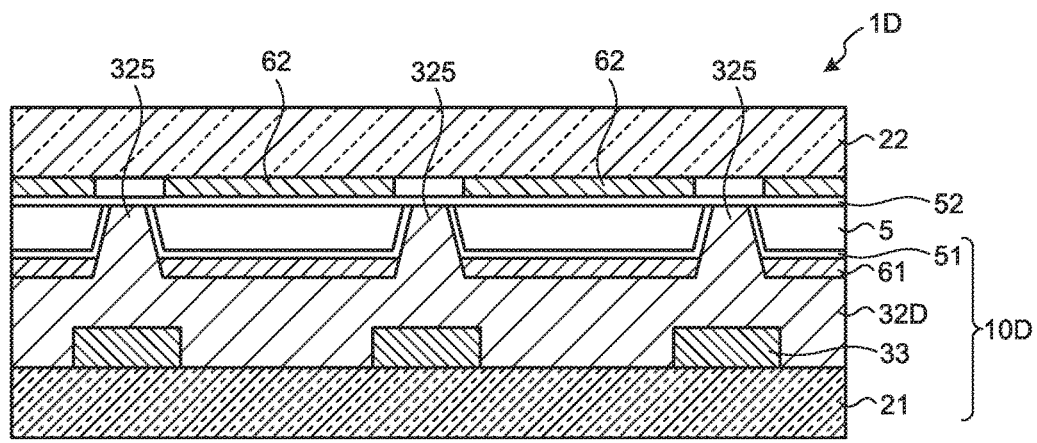
FIG. 11 is a cross-sectional view of a display apparatus according to a fourth modification of the embodiment.

FIG. 11 is a cross-sectional view of the display apparatus according to a fourth modification of the embodiment. More specifically, FIG. 11 illustrates a cross section obtained by cutting a display apparatus 1D on a plane including middle points of two parallel sides of the rectangular pixel Pix. A substrate 10D for a display apparatus according to the fourth modification includes a translucent coloring layer 32D different from the translucent coloring layer 32 described above.

In the fourth modification, the light shielding layer 33 is formed on the surface of the first substrate 21. The translucent coloring layer 32D is a coloring layer colored in one color, and is made of a resin, for example. The translucent coloring layer 32D overlaps with the light shielding layer 33 in the +Z-direction. For example, the color of the translucent coloring layer 32D is blue. When viewed in the Z-direction, the translucent coloring layer 32D at least overlaps with the entire surface of the display region A1 in which the image is displayed. The color of the translucent coloring layer 32D as a single layer is the same across the entire surface of the display region A1. The thickness of the translucent coloring layer 32D in the Z-direction is larger than the thickness of the light shielding layer 33 in the Z-direction. The translucent coloring layer 32D is, for example, a photo-curable resin, which is applied to the first substrate 21 and the light shielding layer 33 and irradiated with ultraviolet rays to be cured.

This configuration does not require patterning in forming the translucent coloring layer 32D, thereby preventing variations in dimension of the translucent coloring layer 32D. Arranging the translucent coloring layer 32D between the light shielding layer 33 and the liquid crystal layer 5 prevents the liquid crystal layer 5 from being contaminated by the light shielding layer 33.

A spacer 325 is a member for maintaining the thickness (cell gap) of the liquid crystal layer 5. As illustrated in FIG. 11, the spacer 325 is made of the same material as that of the translucent coloring layer 32D, and is formed integrally with the translucent coloring layer 32D. For example, the spacer 325 is formed by half exposure. That is, a portion of the translucent coloring layer 32D excluding the spacer 325 is irradiated with a reduced amount of ultraviolet rays. Removing a non-cured portion from the translucent coloring layer 32D forms the spacer 325. Manufacturing the spacer 325 and the translucent coloring layer 32D in the same process improves manufacturing efficiency.

Fifth Modification

Figure 12:
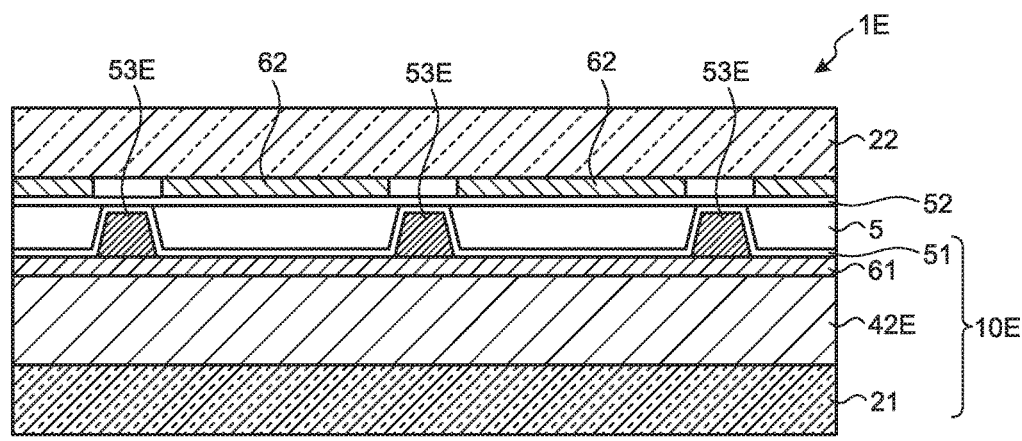
FIG. 12 is a cross-sectional view of a display apparatus according to a fifth modification of the embodiment.
Figure 13:
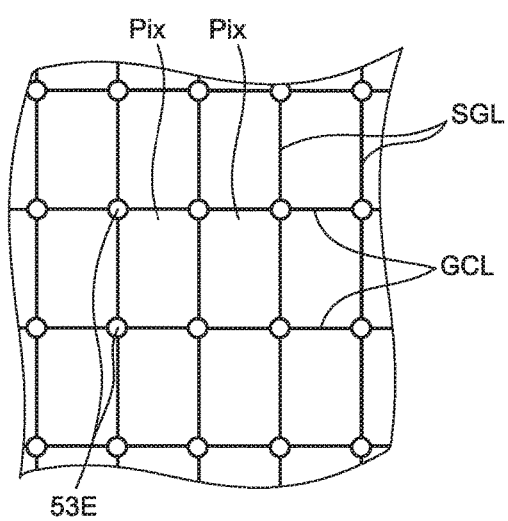
FIG. 13 is a plan view illustrating a display region of the display apparatus according to the fifth modification in an enlarged manner.

FIG. 12 is a cross-sectional view of the display apparatus according to a fifth modification of the embodiment. More specifically, FIG. 12 illustrates a cross section obtained by cutting a display apparatus 1E on a plane including middle points of two parallel sides of the rectangular pixel Pix. FIG. 13 is a plan view illustrating the display region of the display apparatus according to the fifth modification in an enlarged manner. A substrate 10E for a display apparatus according to the fifth modification is different from the substrate 10 for a display apparatus of the embodiment described above in that the light shielding layer 33 is not arranged in the display region A1. The substrate 10E for a display apparatus includes a plurality of colored spacers 53E different from the spacer 53 described above.

A translucent resin layer 42E is a transparent layer made of a resin. The translucent resin layer 42E overlaps with the first substrate 21 in the +Z-direction. The area of the translucent resin layer 42E is identical to the area of the first substrate 21 when viewed in the Z-direction, for example. The counter electrode 61 overlaps with the translucent resin layer 42E in the +Z-direction.

The colored spacer 53E is a member for maintaining the thickness (cell gap) of the liquid crystal layer 5. The colored spacer 53E overlaps with the counter electrode 61 in the +Z-direction. The colored spacer 53E overlaps with a crossing portion of the scanning line GCL and the signal line SGL, for example. As illustrated in FIG. 13, the colored spacers 53E are arranged in a matrix. That is, the colored spacers 53E are arranged at regular intervals in the X-direction and the Y-direction. As illustrated in FIG. 13, the width of the colored spacer 53E in the X-direction is larger than at least one of the width of the scanning line GCL or that of the signal line SGL. The same applies to widths in the Y-direction. The colored spacer 53E is colored in one color, and has translucency. The color of the colored spacer 53E is blue, for example. Each of the colored spacers 53E has the same color.

As illustrated in FIG. 13, one pixel Pix surrounded by the scanning line GCL and the signal line SGL corresponds to one pixel electrode 62 when viewed in the Z-direction. Although the colored spacers 53E are not arranged on the entire surface of the first substrate 21, at least part of light emitted from the pixel Pix is transmitted through the colored spacer 53E. Accordingly, the color of the light emitted from one pixel Pix becomes closer to the color of the colored spacer 53E. The colored spacers 53E are arranged in a matrix, and thus adjacent pixels Pix emit light of the same color when the adjacent pixels Pix have the same gradation. Accordingly, the display apparatus 1E can prevent variations in white balance of the displayed image similarly to the display apparatus 1 described above.

Sixth Modification

Figure 14:
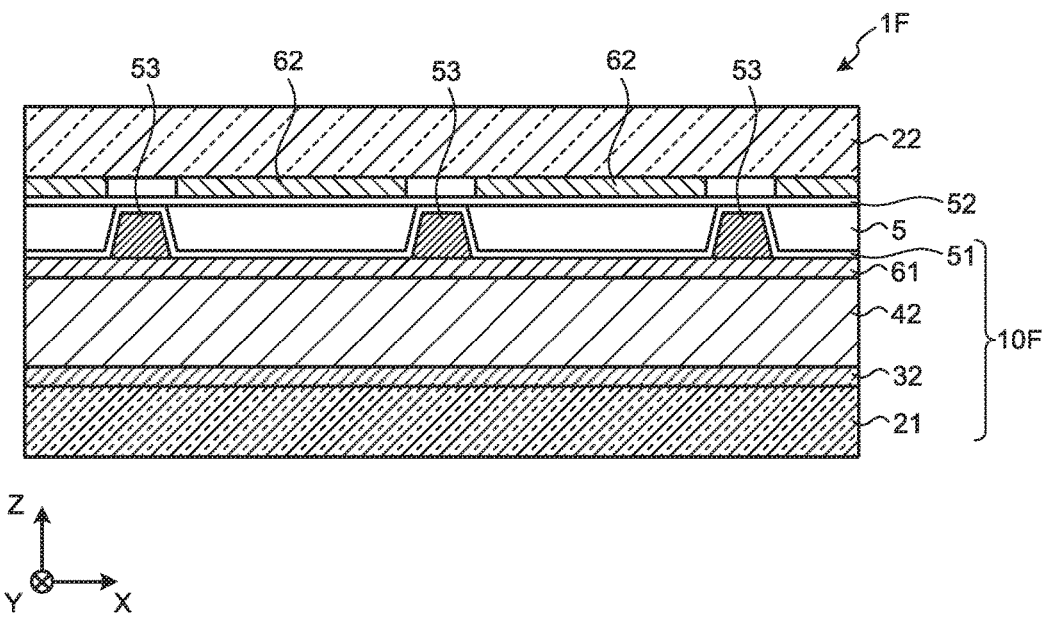
FIG. 14 is a cross-sectional view of a display apparatus according to a sixth modification of the embodiment.
Figure 15:
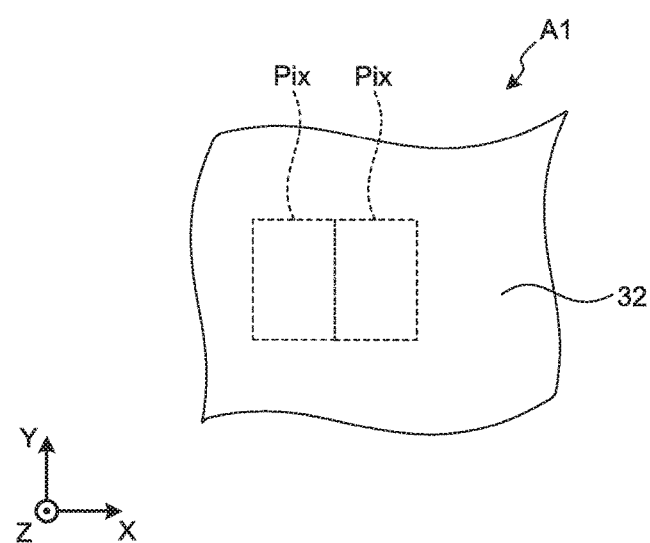
FIG. 15 is a plan view illustrating a display region of the display apparatus according to the sixth modification in an enlarged manner.

FIG. 14 is a cross-sectional view of the display apparatus according to a sixth modification of the embodiment. More specifically, FIG. 14 illustrates a cross section obtained by cutting a display apparatus 1F on a plane including middle points of two parallel sides of the rectangular pixel Pix. FIG. 15 is a plan view illustrating the display region of the display apparatus according to the sixth modification in an enlarged manner A substrate 10F for a display apparatus according to the sixth modification is different from the substrate 10 for a display apparatus described above in that it does not include the light shielding layer 33.

As illustrated in FIG. 15, the translucent coloring layer 32 is uniformly arranged on the entire surface of the display region A1, and the color of the translucent coloring layer 32 as a single layer is the same across the entire surface of the display region A1. Thus, when adjacent pixels Pix have the same gradation, the adjacent pixels Pix emit light of the same color. Absence of the light shielding layer 33 increases the area of the pixel Pix through which light is transmitted. Accordingly, the substrate 10F for a display apparatus can have an increased aperture ratio as compared with the substrate 10 for a display apparatus.

The present invention can naturally provide other advantageous effects that are provided by the aspects described in the embodiment above and are clearly defined by the description in the present specification or appropriately conceivable by those skilled in the art.

What is claimed is:

1. A substrate for a display apparatus comprising:
a first substrate; and
at least one translucent coloring layer that overlaps with the first substrate,
wherein the at least one translucent coloring layer overlaps with an entire surface of a display region in which an image is displayed,
wherein a color of the at least one translucent coloring layer is identical across the entire surface of the display region; and
wherein the at least one translucent coloring layer is configured to receive input light and output light;
when the input light is standard light whose chromaticity is represented as $(x, y) = (0.3101, 0.3162)$ in an xy chromaticity diagram, a chromaticity of the output light is within a range represented by the following expression (1) and outside a range represented by the following expression (2):

$$0.2410 \leq x \leq 0.3740, \text{ and } 0.2385 \leq y \leq 0.4237 \quad (1)$$

$$0.2951 \leq x \leq 0.3251, \text{ and } 0.3012 \leq y \leq 0.3312 \quad (2).$$

2. The substrate for a display apparatus according to claim 1, wherein at least one surface of the at least one translucent color layer is parallel to at least one surface of the first substrate.

3. The substrate for a display apparatus according to claim 1, wherein a thickness of the at least one translucent color layer is constant.

4. The substrate for a display apparatus according to claim 1, further comprising:
a light shielding layer that overlaps with the at least one translucent coloring layer, wherein
the at least one translucent coloring layer is arranged in a layer different from the light shielding layer.

5. The substrate for a display apparatus according to claim 4, wherein
the at least one translucent coloring layer is arranged in direct contact with the light shielding layer.

6. The substrate for a display apparatus according to claim 4, wherein a thickness of the at least one translucent coloring layer in a direction vertical to the first substrate is larger than a thickness of the light shielding layer in the vertical direction.

7. The substrate for a display apparatus according to claim 4, wherein the at least one translucent coloring layer is arranged between the light shielding layer and the first substrate side.

8. The substrate for a display apparatus according to claim 4, wherein the light shielding layer is arranged between the at least one translucent coloring layer and the first substrate side.

9. The substrate for a display apparatus according to claim 4, further a spacer,
wherein the light shielding layer is arranged between the spacer and the first substrate.

10. The substrate for a display apparatus according to claim 1, further comprising a spacer,
wherein the at least one translucent coloring layer is arranged between the spacer and the first substrate.

11. The substrate for a display apparatus according to claim 1, further comprising a spacer that is made of a material identical to a material of the at least one translucent coloring layer, and is integrated with the at least one translucent coloring layer.

12. The substrate for a display apparatus according to claim 1, wherein the at least one translucent coloring layer comprises two or more translucent coloring layers.

13. The substrate for a display apparatus according to claim 1,
wherein the spacer is a colored spacer.

14. The substrate for a display apparatus according to claim 13, wherein
the colored spacer overlaps with at least one of a scanning line or a signal line.

15. The substrate for a display apparatus according to claim 14, wherein
a width of the colored space is larger than at least one of a width of the scanning line or a width of the signal line.

16. A display apparatus comprising:
the substrate for a display apparatus according to claim 1; and
a plurality of pixels arranged on the display region of the first substrate.

17. The display apparatus according to claim 16, wherein the display apparatus is a monochromatic liquid crystal display apparatus.

18. The display apparatus according to claim 16, wherein the display apparatus is a reflective display apparatus.

19. A substrate for a display apparatus comprising:
a first substrate; and
at least one translucent coloring layer that overlaps with the first substrate, wherein the at least one translucent coloring layer overlaps with an entire surface of a display region in which an image is displayed,
wherein a color of the at least one translucent coloring layer is identical across the entire surface of the display region, and
wherein the at least one translucent coloring layer is configured to receive input light and output light;
when the input light is standard light whose chromaticity is represented as $(x, y) = (0.3101, 0.3162)$ in an xy chromaticity diagram, a chromaticity of the output light is within a range represented by the following expression (1) and outside a range represented by the following expression (2):

$$0.2927 \leq x \leq 0.3248, \text{ and } 0.2385 \leq y \leq 0.3265 \quad (1)$$

$$0.2951 \leq x \leq 0.3251, \text{ and } 0.3012 \leq y \leq 0.3312 \quad (2).$$

20. A display apparatus comprising:
the substrate for a display apparatus according to claim 19; and
a plurality of pixels arranged on the display region of the first substrate.

* * * * *